Figure 1:
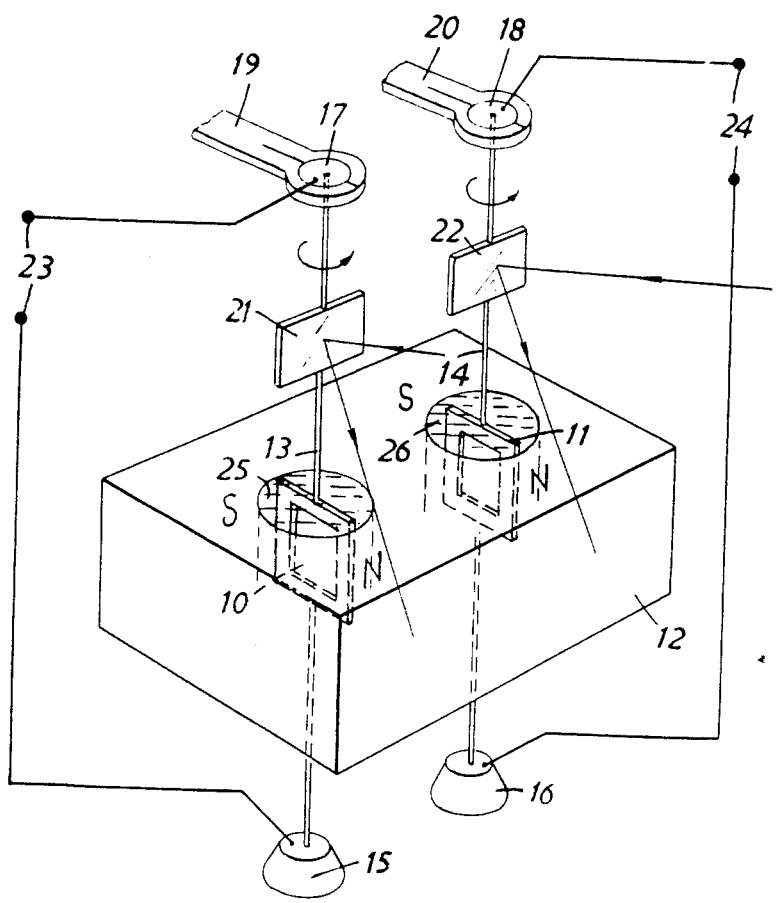

United States
Street

[11] 3,799,644
[51] Mar. 26, 1974

[54] LIGHT-BEAM STEERING APPARATUS
[76] Inventor: Graham Stewart Brandon Street, 115 Perse Way, Cambridge, England
[22] Filed: June 6, 1972
[21] Appl. No.: 260,285

[30] Foreign Application Priority Data
June 9, 1971 Great Britain............... 19573/71

[52] U.S. Cl............................ 350/7, 350/285, 178/7.6
[51] Int. Cl. ............................................ G02b 17/00
[58] Field of Search ........... 350/6, 7, 285, 286, 287; 178/7.6

[56] References Cited
UNITED STATES PATENTS

| | | | |
|---|---|---|---|
| 3,448,458 | 6/1969 | Carlson | 350/6 |
| 3,614,312 | 10/1971 | Fournier | 178/7.6 |
| 3,483,511 | 12/1969 | Rabinow | 178/7.6 |
| 3,428,812 | 2/1969 | Burke | 350/7 |
| 3,350,156 | 10/1967 | Adams | 350/7 |
| 3,650,605 | 3/1972 | Little | 350/7 |
| 3,349,174 | 10/1967 | Warschauer | 178/7.6 |

FOREIGN PATENTS OR APPLICATIONS
520,693  5/1940  Great Britain................. 350/286

*Primary Examiner*—John K. Corbin
*Assistant Examiner*—Michael J. Tokar
*Attorney, Agent, or Firm*—Woodhams, Blanchard & Flynn

[57] ABSTRACT

A light-beam steering apparatus using two suspended mirrors deflectable about parallel axes by passage of currents through respective coils disposed in a magnetic field and an optical system between the mirrors whereby the plane of deflection of the beam is rotated so that the beam can be controlled in position in two preferably perpendicular directions.

13 Claims, 5 Drawing Figures

LIGHT-BEAM STEERING APPARATUS

The present invention relates to a light-beam steering apparatus having two steering mirrors which are angularly displaceable to effect deflection of a light beam in two planes at an angle to one another. Commonly, such apparatus employs mirrors which are displaceable about perpendicular axes in order to deflect the beam in perpendicular directions. To achieve high speeds small mirrors, usually having several faces, are rotated continuously.

The existing apparatus is not adequate where it is required to steer a beam rapidly to a new position in response to signals which may arrive at any instant in time. For this purpose it is necessary to use a very small mirror with low inertia in order to achieve the desired speed of response and random access.

In accordance with the present invention there is provided a light-beam steering apparatus having a first and second steering mirrors supported for angular displacement about parallel axes to deflect an incident light beam in a common plane perpendicular to the axes of displacement, each steering mirror being mounted on its own suspension system which also carries a coil suspended in a magnetic field whereby the associated mirror may be displaced by passage of a current through the coil, and an optical system between the mirrors, the mirrors being at conjugate points of the optical system and the optical system being constructed such that the plane of deflection of the light beam after it has been reflected by the first mirror is rotated into a plane inclined to the common plane of deflection by the mirrors.

The use of two suspended mirrors displaceable about parallel axes greatly facilitates the construction of a system of small dimensions with mirrors of low inertia. In one embodiment two of the mirrors of a multichannel ultra-violet recorder galvanometer are used. In such a moving coil galvanometer, for example type A8000 manufactured by S. E. Laboratories of Feltham, Middlesex, England, a number of suspended systems are provided for deflecting ultra-violet beams on to a recording medium in response to separate input signals applied to the several coils. The coils are suspended in openings in a common magnet block which provides the magnetic field in which the coils move. The mirrors are approximately 1 mm. square and correspondingly light in weight. Whereas the mirrors normally all effect deflections of the incident beams in the same plane, when they are used in a system in accordance with the invention one mirror effects deflection in the said plane and the other mirror effects deflection in another plane which is preferably approximately at right angles to the said plane. Where the input signals represent deflections in two planes at right angles any inaccuracy in the angle between the planes of deflection determined by the steering apparatus can be compensated electrically by feeding combinations of the input signals to the two coils. The optical system can be made adjustable to enable the angle between the planes of deflection to be selected as required.

Figure 2A:
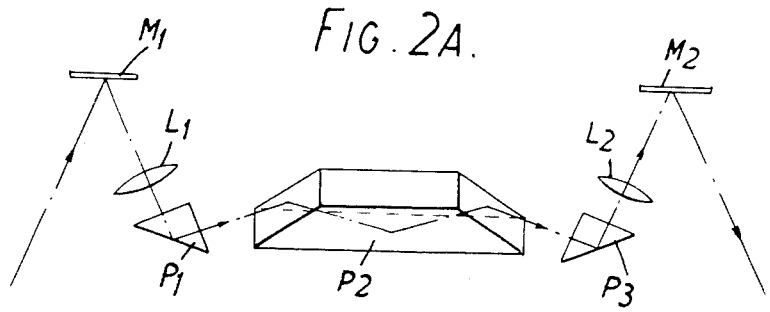
Figure 2B:
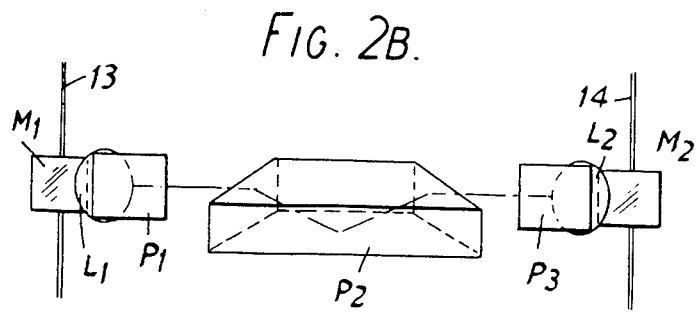
Figure 3A:
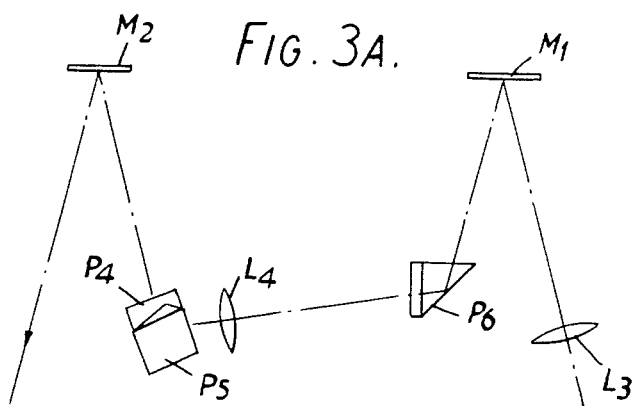
Figure 3B:
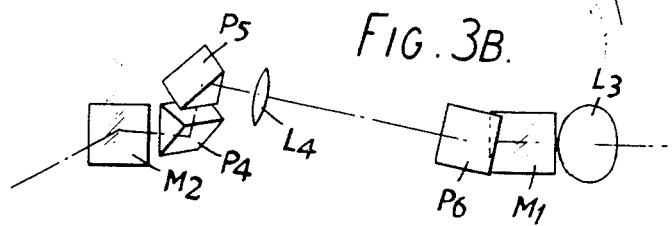

The invention will now be described in more detail with the aid of examples illustrated in the accompanying drawings, in which:

FIG. 1 is a schematic perspective view of the suspended mirrors and their drive system for a light-beam steering apparatus in accordance with the invention, FIG. 2A is a plan view and FIG. 2B an elevation of the mirrors with their associated optical system in one form of the apparatus, and FIG. 3A is a plan view and FIG. 3B an elevation of the mirrors and their associated optical system in a second form of the apparatus.

FIG. 1 shows the essential operating parts of a two-channel galvanometer system having two coils 10 and 11 suspended in openings in a common magnet block 12 which, as indicated by the magnetic poles shown, produces a magnetic field transverse to the plane of each of the coils 10 and 11, which are flat rectangular coils. The coils 10 and 11 are suspended in conventional manner by respective torsion fibres 13 and 14 attached at their lower ends to blocks 15 and 16 respectively and at their upper ends to discs 17 and 18 held by clamps 19 and 20. The discs 17 and 18 allow for angular pre-setting and provision may also be made for tilting the torsion fibres 13 and 14 for purposes of initial setting-up. The torsion fibres 13 and 14 carry mirrors 21 and 22, respectively. The fibres 13 and 14 are electrically conductive and serve to carry current to the coils 10 and 11. As shown, the fibre 13 is electrically connected to input terminals 23 and the fibre 14 to input terminals 24. Thus individual signals applied to the terminals 23 and 24 produce different corresponding angular displacements of the mirrors 10 and 11, as indicated by the arrows, about parallel axes defined by the suspension fibres.

The movement of each of the suspended systems is damped by reason of the fact that the coils 10 and 11 are immersed in bodies of damping fluid 25 and 26, respectively.

In the particular embodiment being described, which is based on the use of an ultra-violet recorder galvanometer of type A8000 as referred to above, the mirrors are 1 mm. square and only 0.1 mm. in thickness and they are spaced apart by about 4.6 cm.

Turning now to FIGS. 2A and 2B, the mirrors 10 and 11 of FIG. 1 are denoted by $M_1$ and $M_2$. The light beam to be deflected falls first on $M_1$, at a small angle of incidence and is reflected in the same plane, which is the plane perpendicular to the axes of displacement of the mirrors defined by the suspension fibres and is in the plane of the paper in FIG. 2A. Any displacement of either of the mirrors by the passage of a current through its associated coil produces a deflection of the light beam incident on the mirror which is initially in this plane. The light beam reflected from the mirror $M_1$ passes by way of a lens $L_1$ and a 45° prism $P_1$ to a Dove prism $P_2$ and thence by way of a 45° prism $P_3$ and a lens $L_2$ to the mirror $P_2$. The prisms $P_1$ and $P_3$ merely serve as reflectors to direct the beam from one mirror to the other through the Dove prism $P_2$. The latter serves, in a manner which is well understood, to rotate the light beam by means of an internal reflection from its bottom face. In the embodiment shown this bottom face has been rotated through 45° from the planes of FIGS. 2A and 2B, resulting in a 90° rotation of the beam passing through the prism. Thus whereas the deflection of the beam by the mirror $M_1$ initially takes place in the plane of FIG. 2A, the beam after passing through the Dove prism $P_2$ is deflected in the plane of FIG. 2B, that is, in a plane parallel to the suspension fibres 13 and 14 of the mirrors $M_1$ and $M_2$. The beam then passes to the mirror $M_2$ which effects deflection in the plane perpendicular to the deflection resulting from movement of the mirror $M_1$ and rotation by the prism $P_2$.

The lens $L_1$ and $L_2$ serve to bring the incident beam to an intermediate focus near the reflecting surface of the base of the prism $P_2$. They are also so arranged that the mirrors $M_1$ and $M_2$ are located at conjugate points of the optical system, that is to say, each of the mirrors is imaged at the other by the lenses. The lay-out of the optical system is symmetrical, with the prism $P_2$ between the lens $L_1$ and prism $P_1$ on one side and the lens $L_2$ and the prism $P_2$ on the other side. The lenses $L_1$ and $L_2$ have equal focal lengths f and are located at this distance from the mirrors $M_1$ and $M_2$, respectively. The optical distance between the lenses $L_1$ and $L_2$ is $2f$.

In the embodiment shown in FIGS. 3A and 3B the mirrors $M_1$ and $M_2$ are arranged as before at a spacing of about 4.5 cms. The rotation of the plane of deflection is effected in this case by two 45° prisms $P_4$ and $P_5$ and a third 45° prism $P_6$ serves as a simple reflector to direct the light beam. A lens $L_3$ is placed before the mirror $M_1$ and a lens $L_4$ between the prism $P_6$ and the prisms $P_4$ and $P_5$. The lens $L_4$ has a focal length $f$ which in this embodiment is 2.1 cm. The focal length of the lens $L_3$ is $2f$. The spacing between $L_3$ and $M_1$ is $f$ and that between $M_1$ and $P_6$ is $f$ so that the beam is brought to an intermediate focus near the reflecting surface of $P_6$.

The distance from $P_6$ to $L_4$ is $f$ and the optical distance from $L_4$ to $M_2$ is $2f$, taking into account the path length through the prisms $P_4$ and $P_5$. Hence the lens $L_4$ of focal length $f$ images the mirror $M_1$ at the mirror $M_2$ and vice versa.

The prism $P_5$ deflects the beam out of the plane of FIG. 3A, which is the plane perpendicular to the axes of displacement of the mirrors in which the deflection of the beam by the mirrors takes place. The beam proceeds approximately perpendicular to this plane between the prisms $P_5$ and $P_4$ and is then reflected towards the mirror $M_2$ in a plane generally parallel to the plane in which it was incident on $P_5$. The inclined reflecting surfaces of $P_4$ and $P_5$ are rotated through approximately 90° with respect to each other about the axis of the beam passing between them.

It will be noted that the system of FIGS. 3A and 3B has been described with the light beam passing through it in the opposite direction to that of FIGS. 2A and 2B but it will be appreciated that the direction in each system is reversible.

I claim:

1. A light-beam steering apparatus, comprising in combination first and second steering mirrors, first and second suspension means supporting said first and second mirrors, respectively, for angular displacement about parallel axes to deflect an incident light beam in a common plane perpendicular to said parallel axes of displacement, first and second deflection coils mounted on said first and second suspension means, respectively, and suspended in a magnetic field whereby the associated mirror may be displaced by passage of a current through the corresponding coil, and means defining an optical system between the mirrors for causing the plane of deflection of the light beam after reflection by the first mirror and prior to incidence on said second mirror to be rotated into a plane inclined to the said common plane of deflection, said optical system including means defining first and second reflectors cooperatively disposed with respect to each other for causing a light beam incident on the first reflector in one plane to pass between the reflectors in a direction generally perpendicular to the said one plane and emerge from the second reflector in a plane generally parallel to said one plane and at an angle to its direction of incidence, the optical system further comprising lens means, said mirrors being disposed at conjugate points of said lens means.

2. Apparatus as claimed in claim 1 wherein the optical system comprises a third reflector between the first steering mirror and the lens means.

3. Apparatus as claimed in claim 2 including a further lens preceding said first mirror in the path of said light beam and arranged to focus said beam at said third reflector, said third reflector lying at the focus of said lens means.

4. Apparatus as claimed in claim 1 in which said first and second reflectors are internally reflecting prisms.

5. Apparatus as claimed in claim 1 in which each of said first and second reflectors is disposed to deflect the beam through about 90° and the planes of deflection of said first and second reflectors are approximately perpendicular to one another.

6. Apparatus as claimed in claim 1 in which the optical path length from said first mirror to said lens means is equal to the optical path length from said lens means to said second mirror.

7. A light beam steering apparatus, comprising in combination:

first and second steering mirrors;

first and second suspension means supporting said first and second steering mirrors, respectively, for angular displacement about parallel axes to deflect an incident light beam in a common plane perpendicular to said parallel axes of displacement, first and second deflection coils mounted on said first and second suspension means, respectively, and suspended in a magnetic field whereby the associated mirror is displaceable by passage of a current through the corresponding coil, an optical system defining a light path between said mirrors for conveying said light beam therebetween, said optical system including reflector means on said light path between said mirrors for rotating the plane of deflection of said light beam into a plane transverse to said common plane of deflection, whereby the light beam passes between the first steering mirror and said reflector means in said common plane of deflection and passes from the reflector means to said second steering mirror in said transverse plane of deflection, said optical system further including lens means in said light path between said mirrors and spaced from said mirror means, said steering mirrors being disposed at conjugate points of said lens means whereby each of the steering mirrors is imaged at the other via said lens means.

8. Apparatus as claimed in claim 7 in which said reflector means includes a reflecting surface on said light path near an intermediate focus of said lens means.

9. Apparatus as claimed in claim 8 in which the spacing from said lens means to said steering mirrors is the same for both steering mirrors, said distance being one or more focal lengths of said lens means.

10. Apparatus as claimed in claim 9 in which the spacing between said lens means and said reflecting surface is one focal length of said lens means.

11. Apparatus as claimed in claim 10 in which said lens means comprises first and second lenses disposed on said light path at a distance of one focal length from said first and second steering mirrors, respectively, said reflecting means comprises a dove prism evenly spaced between the first and second lenses on said light path, said first and second lenses having the same focal length and being separated on said light path by a distance equal to two focal lengths thereof, and including first and second reflectors disposed, respectively, between said first lens and said dove prism and between said dove prism and said second lens and on said light path, said first and second lenses and said first and second reflectors being disposed in said common plane.

12. Apparatus as claimed in claim 10 in which said lens means comprises a lens disposed in said light path at a distance of two focal lengths thereof from each of said first and second steering mirrors, said reflecting surface being spaced between said lens and said first steering mirror at distance of one focal length of said lens from each, said reflector means further comprising first and second reflectors skewed with respect to each other and aligned transversely of said common plane for carrying out said rotation of said light beam, said first and second reflectors being disposed between said lens and second mirror, a further lens of focal length double that of said first mentioned lens and spaced along the path by which said light beam approaches said first steering mirror at the focal length of said first mentioned lens for focusing said beam on said reflecting surface.

13. Apparatus as claimed in claim 10 in which said reflector means comprises three reflective prisms disposed sequentially along said light path between said steering mirrors and said lens means comprises at least one lens disposed in said light path in cooperating relation with said reflector means.

* * * * *